H. E. EARL.
AUTOMATIC WEIGHING SCALE.
APPLICATION FILED JULY 16, 1918.
1,339,326.
Patented May 4, 1920.
2 SHEETS—SHEET 2.
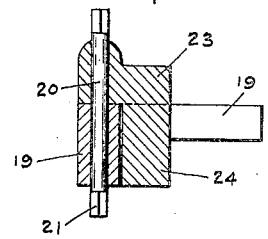
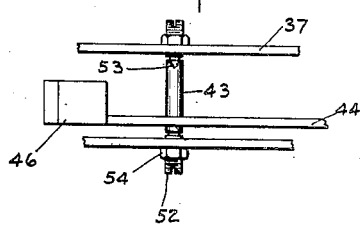
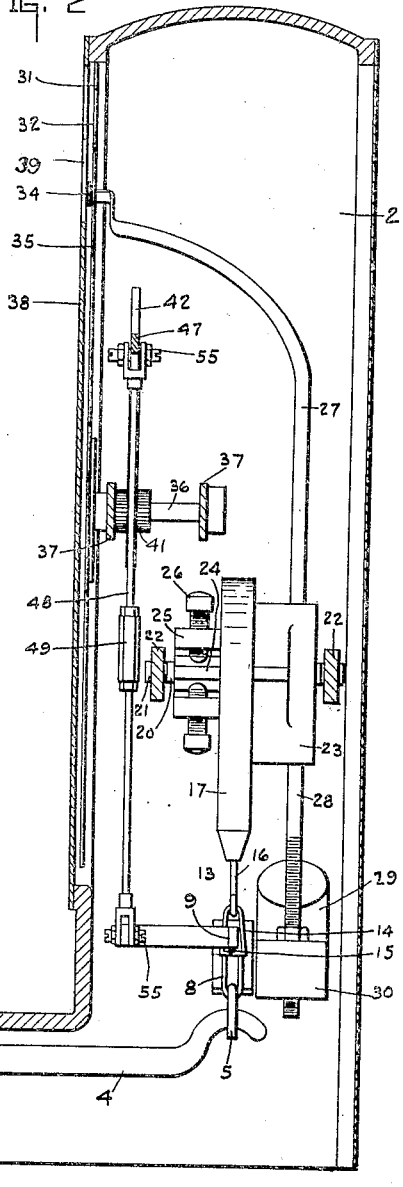
INVENTOR
HENRY E. EARL
BY
Lockwood+Lockwood
ATTORNEYS

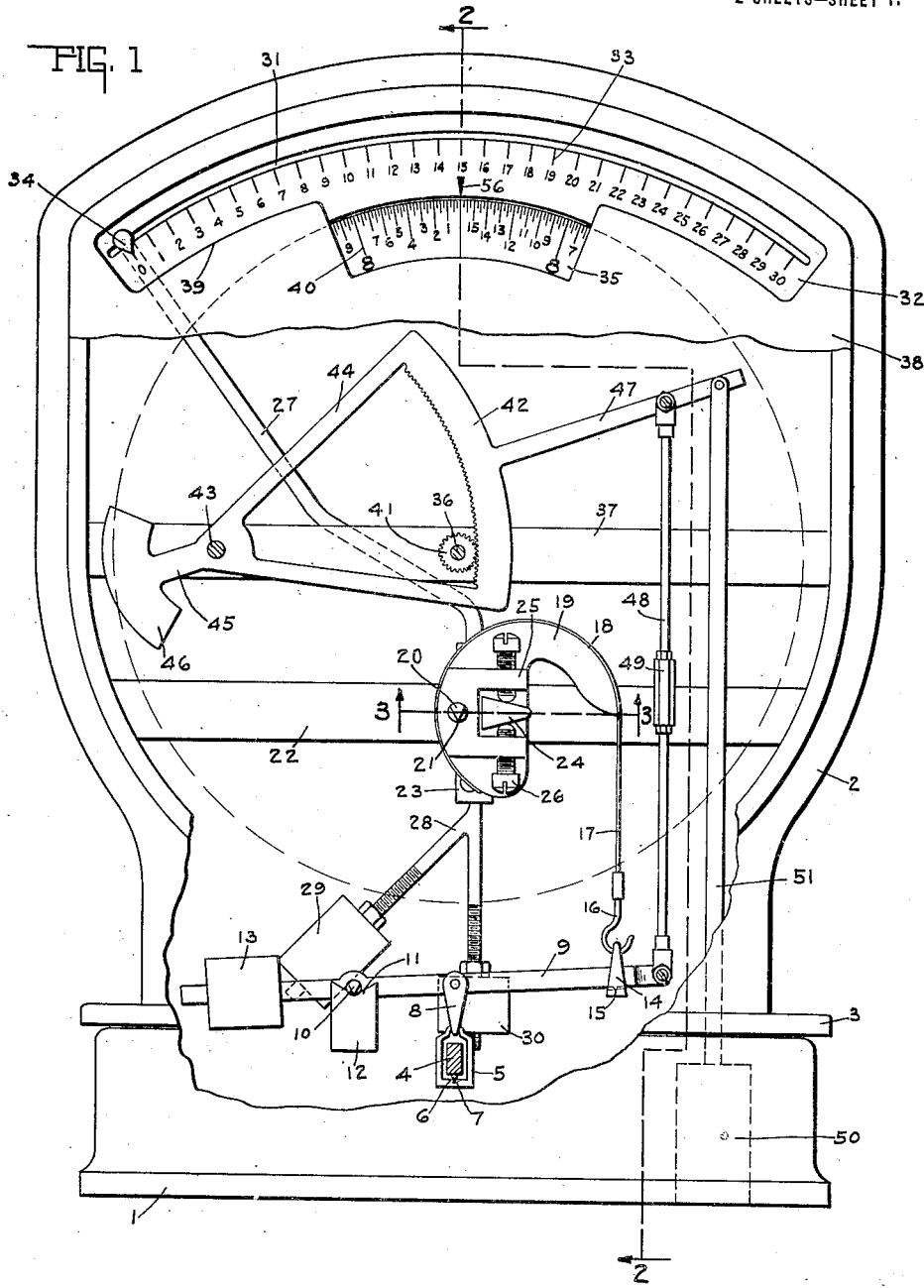

UNITED STATES PATENT OFFICE.

HENRY E. EARL, OF INDIANAPOLIS, INDIANA.

AUTOMATIC WEIGHING-SCALE.

1,339,326.  Specification of Letters Patent.  Patented May 4, 1920.

Application filed July 16, 1918. Serial No. 245,129.

*To all whom it may concern:*

Be it known that I, HENRY E. EARL, a subject of the King of England, and a resident of Indianapolis, county of Marion, and State of Indiana, have invented a certain new and useful Automatic Weighing-Scale; and I do hereby declare that the following is a full, clear, and exact description thereof, reference being had to the accompanying drawings, in which like numerals refer to like parts.

This invention relates to automatic weighing scales, and the prime object of the invention is the provision of means for indicating the pound and fractional pound weights at different points and by different parts whereby the figures or divisions on the scale may be more readily read. A further feature of the invention is the provision of weights employed for counter-balancing the weight of the object on the platform of the scale, said weights being so arranged that when one of them has been swung upwardly above the center of gravity, the other weight will act to continue the regulation of the weight of the object upon the platform of the scale. A further feature of the invention is the provision of means for obtaining adjustment, at the point of connection, between the scale lever and the indicating arm for the pound weights. A further feature of the invention is the provision of means for connecting the operating means for the disk carrying the fractional pound graduations and the indicating arm coöperating with the pound graduations, whereby said parts will work in unison. A further feature of the invention is in so constructing the parts of the scale that they may be readily applied to use in connection with the ordinary brake beam scales.

Other objects and advantages will be hereinafter set forth and more particularly pointed out in the accompanying specification.

In the accompanying drawings which are made a part of this application, Figure 1 is an elevation of the scale structure with parts of the framework thereof broken away, and showing the main platform lever in sections. Fig. 2 is a vertical sectional view thereof as seen on line 2—2, Fig. 1. Fig. 3 is an enlarged detail sectional view as seen on line 3—3, Fig. 1. Fig. 4 is a top plan view of a part of the rack employed for operating the disk, having the fractional pound gradations thereon, showing the pivotal means for mounting the rack upon parts of the frame of the scale.

Referring to the drawings in which similar reference numerals designate corresponding parts throughout the several views, 1 indicates the base or body portion of the ordinary platform weighing scale, and 2 indicates a vertically extending housing at one end of the base, said base having a platform 3 coöperating therewith, these parts being of the usual or any preferred construction.

The platform 3 is mounted in the usual or any preferred manner, upon a main platform lever 4, one end of which is extended into the vertical housing 2 where it is engaged with a stirrup 5, the under face of the lever 4 preferably having a conical bearing point 6 which engages a tapered recess 7 in the lower bar of the stirrup 5 so as to obtain a more sensitive connection between these parts and at the same time permit slight vibratiton or movement between the parts, without affecting the weighing qualities of the scale.

The upper end of the stirrup 5 is attached to a clevis 8, which is in turn pivoted to a weighing lever 9, said lever having knife edge bearing points 10 which engage tapered recesses 11 in a bearing block 12, which block is stationery and supported from any suitable means. The lever 9 extends a distance beyond each side of the bearing block, and one end is provided with an adjustable weight 13, the clevis 8 being attached to the lever 9 at the opposite side of the bearing point from the weight 13.

At a point beyond the clevis 8, the lever 9 extends through a stirrup 14, the lever 9 at this point having a conical bearing point 15 which co-acts with the recess in the stirrup 14, the action thereof being the same as the bearing 6 of the lever 4 with the recess 7 of the stirrup 5. Attached to the stirrup 14 by means of a hook 16, or otherwise, is one end of a strap 17, the opposite end of the strap extending upwardly and over the curved edge 18 of an adjusting cam 19, the end of the strap being secured to the surface of the cam. The cam 19 is mounted upon a shaft 20, the ends of which are provided with knife edge bearing points 21 which enter seats (not shown) in supporting bars 22 carried by the housing 2, the adjusting cam being rotatable on said shaft 20.

Also mounted upon the shaft 20 and secured thereto, in such manner as to cause the shaft to rotate therewith, is a carrier 23 which has a wedge shape extension 24 projecting laterally therefrom, and which passes between a pair of ears 25 on the adjusting cam 19, the cam 19 being adjusted and caused to move in unison with the carrier 23 by introducing set screws 26 through said ears and into engagement with the tapered faces of the extension 24. By this arrangement a minute adjustment may be obtained between the cam 19 and carrier 23, which is very essential in view of the fact that the upper end of the carrier 23 has an indicating arm 27 attached thereto, while the lower end of the carrier has pendulum rods 28 attached thereto, upon which are adjustably mounted pendulum weights 29 and 30.

The upper end of the indicating arm 27 extends through a circumferentially arranged slot 31 in a chart 32, said chart having graduations 33 thereon, arranged in this instance to indicate pound weights, the arm 27 having a pointer finger 34 thereon, which is adapted to register with the graduations 33 to indicate the number of pounds which have been placed upon the platform 3. The pendulum rod 28, carrying the weight 29, is preferably disposed at an angle to the vertical axis of the carrier 23, while the rod 28 carrying the weight 30 extends in alinement with the vertical axis of the carrier, said rods being joined together near their inner ends, and by arranging the rods in this manner the weight 29 will normally balance the leverage occasioned by placing an object upon the platform to be weighed, while the weight 30 will exert its influence upon the weighing parts at a time when the weight 29 begins to lose its effectiveness, due to the upward swinging movement thereof, and by arranging the weights in this manner, the balancing operation will be uniformly maintained during the entire movement of the weighing parts.

The graduations on the chart 32 are to indicate pounds only, and in order to ascertain and indicate the ounces or fractions of ounces, a disk 35 is attached to a shaft 36 which is rotatably mounted in supporting bars 37 carried by the housing 2, said disk and the chart 32 being positioned in the rear of the front face 38 of the housing 2, said face having a visual space 39 through which the graduations on the chart and the graduations 40 on the disk may be read.

The disk 35 is operated through the medium of a pinion 41 fixed to the shaft 36, and a segmental rack 42 which rack is pivoted to a shaft 43 carried by the supporting bars 37, the ends of the rack having arms 44 which converge and terminate into a body portion 45 through which the shaft 43 extends, the free end of the body portion having a counter-weight 46 which acts to raise the segmental rack and return it to its initial position after it has been operated. Extending outwardly from the rack 42 is an operating bar 47 to which is attached one end of a pitman 48, the opposite end of the pitman being attached to the free end of the weighing lever 9 and through the medium of which the rack is lowered to rotate the disk. The pitman is preferably formed in two sections, and the meeting ends thereof are connected together by means of a turn buckle 49 so that the length of the pitman may be readily adjusted to accommodate the stroke of the rack with the movement of the weighing lever.

In order to stabilize the action of the weighing parts and prevent rapid movement thereof, as when a weight is suddenly thrown upon the platform, a dash pot 50 is provided and the piston rod 51, coöperating therewith, is attached to the outer end of the operating bar 47 so that the movement of the parts of the scale will be gradual. The shaft 43 is mounted between the supporting bars 37 by introducing adjusting screws 52 through the supporting bars 37, the inner ends of the screws having points 53 which enter tapered recesses in the ends of the shaft 43, the screws being held in their adjusted position by means of locking nuts 54. The ends of the pitman 48 are likewise attached to their respective parts by means of screws 55 which are similarly constructed to the screws 52 so as to present the least binding or frictional surface between these parts.

In operation, when an object to be weighed is placed upon the platform 3, the main lever 4 is depressed which pulls downwardly on the weighing lever 9, and through the medium of the strap 17 imparts rotating motion to the adjusting cam 19. The rotation of the cam 19 likewise causes the carrier 23 to rotate and swings the indicating arm 27 from left to right over the chart 32, and coincident with the descending of the weighing lever 9, the rack 44 is lowered, which will impart rotating motion to the disk 35, the rotation of the disk successively bringing the graduations 40, which in this instance are indicated as ounces, below the designating point 56. If the finger 34 stops directly on a pound mark, it is not necessary to observe the graduations on the disk 35, as the point 56 would register with the division line between the ounce graduations for the respective pounds. Should, however, the finger 34 stop between two of the pound marks on the chart 32, then the entire weight is ascertained by noting the last pound graduation which the finger 34 has passed, and then the number of ounces which the article weighs, over the even pound, is noted by observing the graduations on the disk 35. That is to say, should the article weigh twelve pounds and three ounces, the indicating finger 34 will pass beyond the twelve pound mark on the chart 32, and the disk 35 will have rotated twelve pound spaces and three ounce spaces over, or until the numeral three of one of the ounce divisions on the disk is positioned directly below the indicator 56. Should the article weigh less than a pound, the number of ounces or fractional parts thereof that the article weighs can be readily ascertained by noting the graduations on the disk 35, as the exact number of ounces and fractional parts of an ounce, if the article weighs less than a pound, will be indicated at the point in registration with the pointer 56 so that articles weighing less than a pound can be as accurately weighed as those weighing more than a pound.

By this form of device the exact weight of an article can be very quickly ascertained from the fact that by separating the graduations for the ounces from the graduations for the pounds, both sets of graduations can be much more quickly read, and a greater number of each set of graduations can be provided in the same space without creating confusion in reading than would be possible where the graduation of the pounds and ounces are placed together.

It will likewise be seen that by providing the various knife edge bearings for the several co-acting parts, a more sensitive structure will be provided and one that will be more accurate in its results. It will further be seen that by disengaging the platform lever from the stirrup 5 and engaging parts of the ordinary platform scale therewith, the weight of articles placed thereon will be given the same as when the ordinary scale beam is used, the present weight indicating parts displacing the ordinary scale beam.

It will likewise be seen that by providing the adjusting means between the indicating arm carrier and the operating cam therefor, an accurate operation of the indicating arm may be maintained at all times, and furthermore, by providing the adjustable weights on the pendulum rods and by arranging the same so that one will compensate for the lost balancing power of the other, that an accurate weight will be given to the full capacity of the scale.

It will likewise be noted that the ounce indicating graduations and fractional parts thereof will be operated in unison with the pound indicating arm, and the accurate coöperation between these parts is maintained by providing the adjustable pitman which connects the operating mechanism for the ounce containing indicating disk and the operating lever for the indicating arm, and likewise by providing the dash pot, the operation of the parts of the scale will be uniform and gradual.

It will also be understood that, although the graduations on the chart 32 are shown as indicating pounds, said divisions may indicate larger denominations, as hundred pounds or thousand pounds, according to the size of scale used, and likewise the disk 35 may contain pound divisions and fractions thereof, instead of ounce divisions.

The invention claimed is:

1. In an automatic weighing scale, the combination with a swinging pound indicating arm, of a rotating disk having fractional pound graduations thereon, a pinion connected with said disk, a segmental rack coöperating with said pinion, and means independent of each other for simultaneously operating said rack and indicating arm whereby said arm and disk will move in unison to designate the weight of an object in pounds and fractional parts of a pound.

2. In an automatic weighing scale the combination with a platform lever, a pivotally mounted weighing lever, and means to connect the platform lever and weighing lever, of an eccentrically mounted cam connected to the weighing lever, an indicating arm connected with said cam, a pendulum extending from parts of said indicating arm and resting in a vertical plane when the arm is inoperative, a counter balancing weight adjustably attached to said pendulum, a second pendulum attached to the first pendulum at a point between the ends of the first pendulum and projecting outwardly at an angle therefrom, a counter balancing weight adjustably attached to the second pendulum, one of said weights traveling in advance of the other, whereby the succeeding weight will assume and continue the balancing operation after the preceding weight has passed beyond the center of gravity, and the balancing power thereof is decreased, whereby the weight upon the platform lever will be fully counter balanced throughout the movement of said indicating arm.

3. In an automatic weighing scale, the combination with a swinging pound indicating arm, a weighing lever and means for operatively connecting the swinging arm to said weighing lever, of a rotating disk having fractional pound graduations thereon, a pinion connected with said disk, a pivotally mounted segmental rack coöperating with said pinion, a bar projecting from said rack and a pitman connecting said operating bar with said weighing lever, whereby when the weight of an object is directed against the weighing lever the pound indicating arm and the disk will be simultaneously and independently operated for indicating the weight of the object in pounds and ounces.

4. In an automatic weighing scale, a swinging pound indicating arm adapted to coöperate with fixed pound graduations, a rotating disk having fractional pound graduations thereon, a fixed indicating point for coöperation with said disk graduations, the pound graduation and the visible fractional pound graduations being in close proximity to each other, whereby the total weight may be instantly read, a weighing lever, and separate means for operatively connecting the swinging arm and the rotating disk to said weighing lever, whereby said parts will be independently and simultaneously operated.

HENRY E. EARL.